US007853405B2

(12) United States Patent
Yamamoto

(10) Patent No.: US 7,853,405 B2
(45) Date of Patent: Dec. 14, 2010

(54) INTERVEHICLE COMMUNICATION SYSTEM

(75) Inventor: Atsushi Yamamoto, Nagoya (JP)

(73) Assignee: DENSO CORPORATION, Kariya (JP)

( * ) Notice: Subject to any disclaimer, the term of this patent is extended or adjusted under 35 U.S.C. 154(b) by 929 days.

(21) Appl. No.: 11/727,993

(22) Filed: Mar. 29, 2007

(65) Prior Publication Data

US 2007/0265767 A1 Nov. 15, 2007

(30) Foreign Application Priority Data

May 9, 2006 (JP) ............................ 2006-130810

(51) Int. Cl.
*G06F 19/00* (2006.01)
*G06K 9/00* (2006.01)

(52) U.S. Cl. ......................... 701/301; 701/49; 340/468; 382/103; 362/466; 315/82

(58) Field of Classification Search ................. 701/301, 701/45, 36, 49, 117; 340/468; 382/103; 362/466, 465; 315/82
See application file for complete search history.

(56) References Cited

U.S. PATENT DOCUMENTS

2007/0280503 A1* 12/2007 Kubota et al. ............... 382/103
2008/0215231 A1* 9/2008 Breed ......................... 701/117
2010/0073480 A1* 3/2010 Hoek et al. ................. 348/148

FOREIGN PATENT DOCUMENTS

| | | |
|---|---|---|
| JP | A-2004-102889 | 4/2004 |
| JP | A-2004-306894 | 11/2004 |
| JP | A-2005-263012 | 9/2005 |
| JP | A-2006-82692 | 3/2006 |
| JP | A-2006-232247 | 9/2006 |

OTHER PUBLICATIONS

Office Action mailed Jul. 21, 2009 from Japan Patent Office in the corresponding Japanese Patent Application No. 2006-130810 (and English translation).

* cited by examiner

*Primary Examiner*—Ronnie Mancho
(74) *Attorney, Agent, or Firm*—Posz Law Group, PLC

(57) ABSTRACT

A driving support system for use in a vehicle uses a headlight controller for directing a headlight beam on a road surface in an intersection when the vehicle stops at the intersection. Another vehicle simultaneously approaching the intersection detects the beam of the surface with an image sensor and processor of the driving support system. The system of the another vehicle sends back a vehicle ID signal to the stopping vehicle when a predetermined beam pattern is recognized by the processor. Then, the system uses a buzzer for notifying a driver of the stopping vehicle that the ID signal has been returned.

20 Claims, 5 Drawing Sheets

INTERVEHICLE COMMUNICATION SYSTEM

CROSS REFERENCE TO RELATED APPLICATION

This application is based on and claims the benefit of priority of Japanese Patent Application No. 2006-130810 filed on May 9, 2006, the disclosure of which is incorporated herein by reference.

FIELD OF THE INVENTION

The present invention generally relates to a driving support system and apparatus for use in a vehicle.

BACKGROUND INFORMATION

In recent years, various techniques for preventing an automobile accident at a blind intersection or the like has been proposed, due to an increasing accident rate at night time on the ground that the accidents in day time are none at all desirable.

That is, Japanese patent document JP-A-2004-306894 discloses a driving support apparatus that controls a light beam of the headlamp at a stop sign of an intersection. More practically, the apparatus directs the light beam on a ground inside of the intersection so that other vehicles approaching the intersection can recognize that there is a vehicle stopping closely at the intersection. In this manner, the accidents at the blind intersection at night time is prevented.

However, the controlling the light beam toward the ground in the intersection is not always a sufficient measure for preventing the accidents, because a driver of the other approaching vehicle do not always detect the light beam reflected on the ground, or because getting priority right regarding which vehicle passes the intersection first is solely dependent on the agreement of implicit decisions of the drivers on respective vehicles.

SUMMARY OF THE INVENTION

In view of the above and other problems, the present invention provides a driving support system and apparatus that prevents an accident at an intersection by providing a priority determination cause for drivers involved in the decision of passing priority.

The driving support system for use in a vehicle includes a light control unit for controlling a light of the vehicle, wherein the light is controlled to light an intersection road surface when the vehicle is stopping at a stop position of an intersection, a signal transmission unit for transmitting an entrance signal before the vehicle is entering the intersection, wherein the entrance signal is transmitted when lighting on the intersection road surface by a stopping vehicle at the intersection is detected by the transmission unit; and a notification unit for providing a stop notification that encourages a driver to stop at the stop position of the intersection for an extended time, wherein the notification unit provides the stop notification when the entrance signal is received by the notification unit. At least two vehicles equipped with the light control unit, the signal transmission unit and the notification unit are organized as a system for supporting driving operation of the respective vehicles. In this case, the light control unit, the signal transmission unit and the notification unit described above serve as the driving support apparatus in combination.

By employing the driving support system and apparatuses, the stopping vehicle at the intersection is recognized by an approaching vehicle based on a beam pattern controlled by the apparatus on the stopping vehicle. Then, the entrance signal is transmitted from the approaching vehicle. The apparatus on the stopping vehicle notifies its driver of an approach of the approaching another vehicle based on a reception of the entrance signal, thereby encouraging the driver to extend a stop time.

In this manner, the driver of the approaching vehicle recognizes the stopping vehicle before entering the intersection. The driver of the stopping vehicle recognizes the approaching vehicle and is encouraged to yield the right of the way to the approaching vehicle. Therefore, the traffic at an intersection is preferably managed, and, as a result, traffic accident at the intersection is appropriately prevented.

Further, the system and apparatus for supporting driving operation may establish reciprocal communication by employing the light control unit and a warning unit. That is, the warning unit may serve as a combination of the signal transmission unit and the notification unit in addition to providing a warning for the driver of the self vehicle. In this manner, the system and apparatus may provide the same function with a minimum number of components.

BRIEF DESCRIPTION OF THE DRAWINGS

Other objects, features and advantages of the present invention will become more apparent from the following detailed description made with reference to the accompanying drawings, in which.

DETAILED DESCRIPTION

Figure 10:
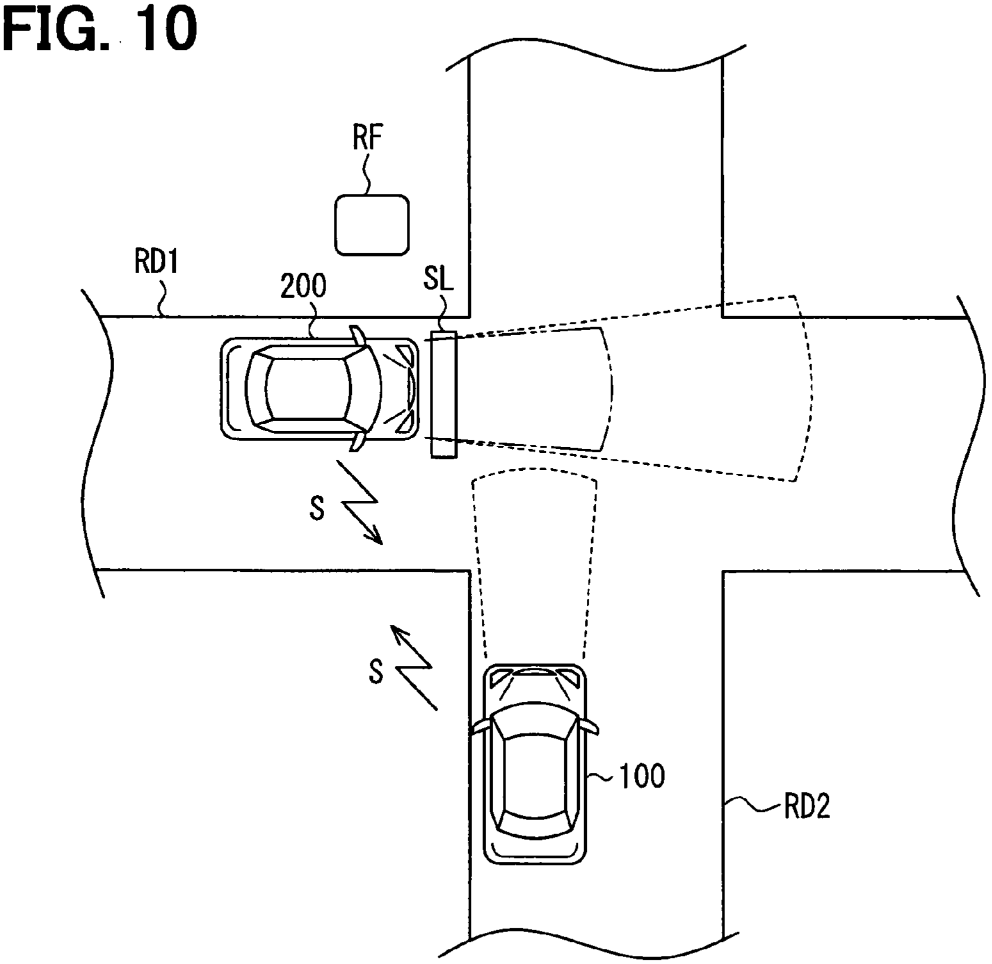
FIG. 10 shows another illustration of the intersection with two approaching vehicles equipped with the driving support apparatus of the present disclosure.

Preferred embodiments of the present invention will now be described with reference to the accompanying drawings. In the present embodiment, a driving support system and apparatus expect a roadside facility (RF) that transmits a stop signal for notifying drivers of approaching vehicles that the intersection ahead of the vehicle requires a temporary stopping operation of the vehicle as shown in FIG. 10. Though the accompanying drawings typically describe situations in left side traffic, the embodiment can also be applicable to right side traffic by reversing the left-right relationship.

Figure 1:
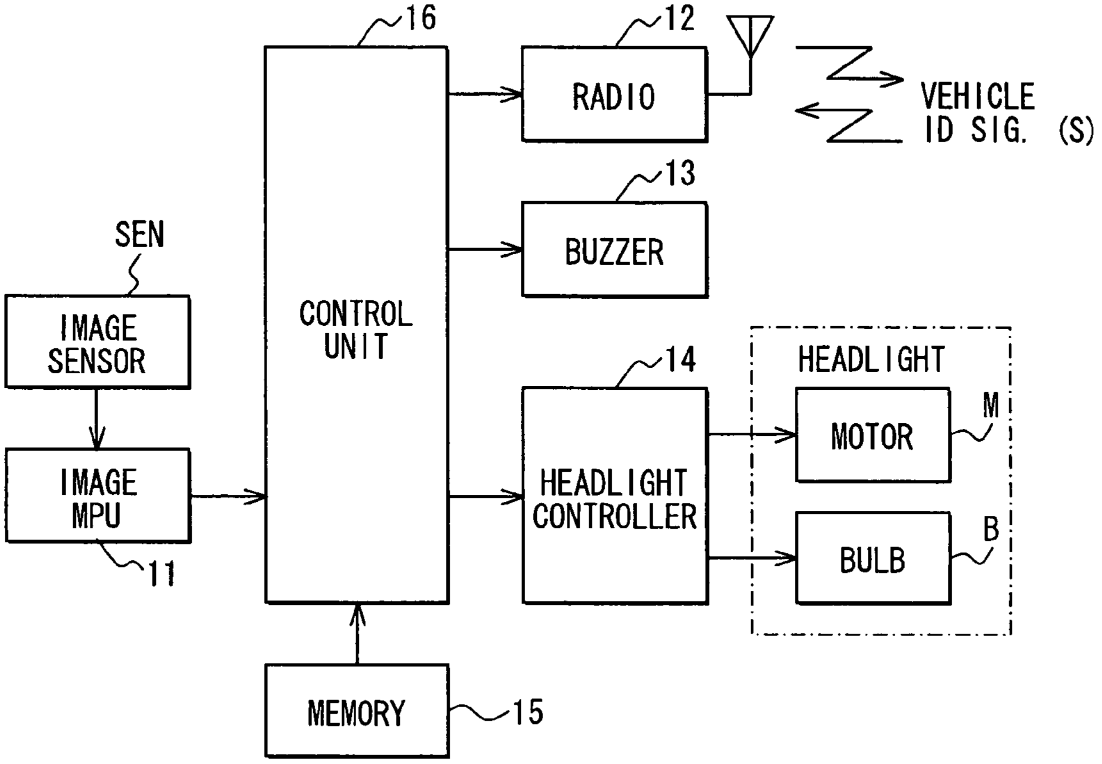
FIG. 1 shows a block diagram of a driving support apparatus in an embodiment of the present disclosure.

As shown in a block diagram in FIG. 1, a driving support system of the present embodiment includes an image micro processing unit (MPU) 11 for processing image from an image sensor SEN connected thereto, a radio 12 for communicating vehicle ID signals (S) with other vehicles, a buzzer 13, a headlight controller 14, a memory 15, and a control unit 16 that controls all of those components. Plural vehicles respectively equipped with the above-described driving support apparatus organize a driving support system of the present disclosure.

The image sensor SEN in connection with the image MPU 11 is an imaging unit that capture a front image of the vehicle by a charge coupled device (CCD) or the like. The front image of the vehicle includes an image of a road surface ahead of the vehicle equipped with the driving support apparatus. The image sensor SEN is disposed at a front part of the vehicle for imaging the front image of the vehicle. The image MPU 11 sends image data derived from the image sensor SEN to the control unit 16.

The buzzer 13 is disposed on, for example, an instrument panel of the vehicle for providing buzzing sound for the driver of the vehicle.

The headlight controller 14 is coupled with a motor M for controlling a light axis of the headlight in addition to a bulb B of the headlight. The headlight controller 14 controls the motor M and the bulb B upon receiving a headlight control signal from the control unit 16. More practically, a light beam from the headlight may be blinked, a light axis of the light beam may be swiveled, or the like. Further, a high beam for lighting a far front place of the vehicle may be switched to a low beam when the headlight control signal is inputted through a control of the motor M.

The memory 15 stores a unique ID of the vehicle for use in the system operation. The unique ID may be a production serial number of the vehicle or the like.

The control unit 16 of the apparatus executes following process at a predetermined interval. That is, a beam pattern recognition process, a beam control process, and a notification process are controlled by the control unit 16.

Figure 2:
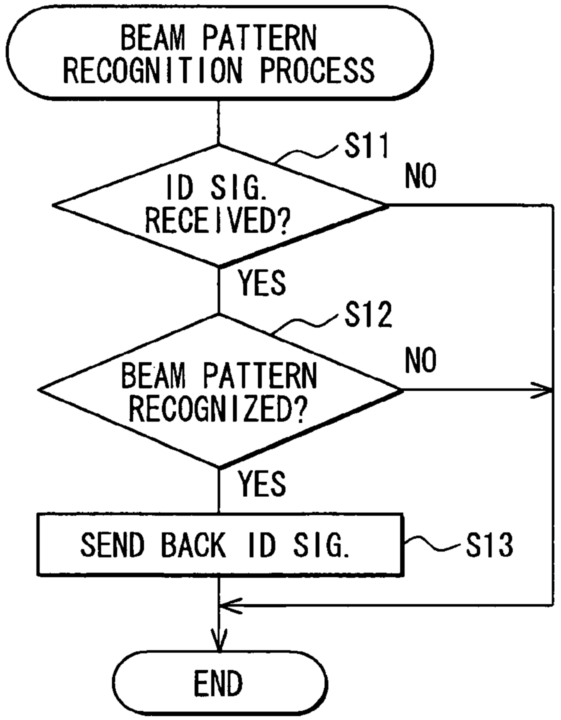
FIG. 2 shows a flowchart of a beam pattern recognition process in the embodiment.

FIG. 2 shows a flowchart of the beam pattern recognition process in the driving support apparatus.

In step S11, the process determines whether the vehicle ID signal (S) from other vehicle is received. The process proceeds to step S12 when the ID signal (S) from at least one other vehicle is received (step S11:YES). The process concludes itself when the ID signal (S) is not received (step S11:NO).

In step S12, the process determines whether a beam pattern on a road surface in front of the vehicle is recognized. That is, the image sensor SEN captures the front image of the vehicle and image data of the front image is sent to the control unit 16 through the image MPU 11. Then, the control unit 16 determines whether the beam pattern on the road surface is, for example, blinking. When the beam pattern is recognized by the control unit 16 (step S12:YES), the process proceeds to step S13. When the beam pattern is not recognized by the control unit 16, or the ID signal from the other vehicle is not received by the control unit 16 (step S12:NO), the process concludes itself.

In step S13, the process sends the vehicle ID signal (S) of the other vehicle back to the other vehicle.

Figure 3:
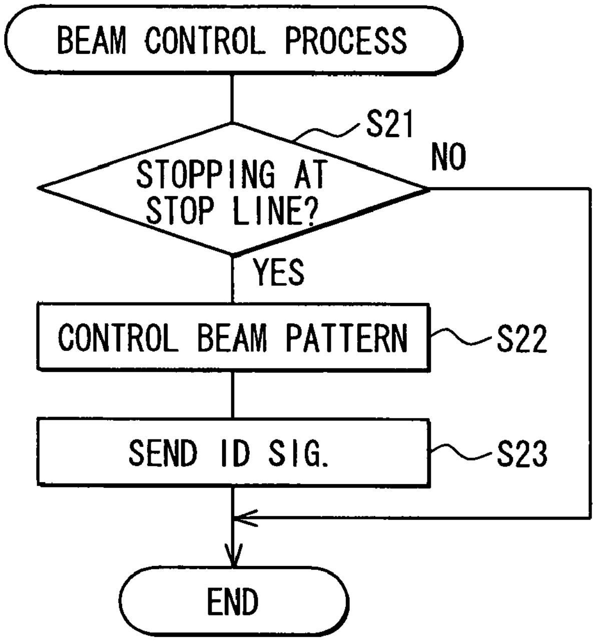
FIG. 3 shows a flowchart of a beam control process in the embodiment.

FIG. 3 shows a flowchart of a beam control process in the present embodiment.

In step S21, the process determines whether the vehicle is stopping at a stop line at an intersection. More practically, the control unit 16 determines whether the vehicle is stopping at the stop line at the intersection when the stop signal from the roadside facility is transmitted to the vehicle. The process proceeds to step S22 when the vehicle is determined to be stopping at the stop line (step S21:YES). The process concludes itself when the vehicle is not stopping at the line (step S21:NO).

In step S22, the process outputs a headlight control signal to the headlight controller 14 for controlling a beam pattern of the headlight or the like. In this manner, the beam pattern of the headlight such as blinking of the beam is controlled, and the light axis of the light beam is turned downward to light the road surface in front of the vehicle. Then, the process proceeds to step S23.

In step S23, the process retrieves the vehicle ID of the vehicle from the memory 15, and send the vehicle ID signal (S) including the unique ID is transmitted from the radio 12.

Figure 4:
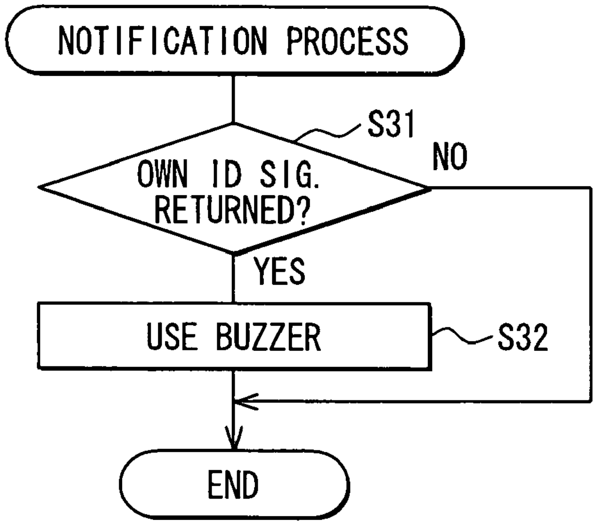
FIG. 4 shows a flowchart of a notification process in the embodiment.

FIG. 4 shows a flowchart of a notification process in the present embodiment.

In step S31, the process determines whether the vehicle ID signal (S) originally transmitted from the vehicle is reciprocally received. That is, the vehicle ID in the received signal (S) and the vehicle ID of an own vehicle stored in the memory 15 are compared. When the vehicle ID in the received signal (S) is identical with the vehicle ID in the memory 15, the process determines that the vehicle ID from the own vehicle is returned from the other vehicle. Then, the process proceeds to step S32.

In step S32, the process uses the buzzer 13 to provide the buzzing sound for the driver. After providing the buzzing sound, the process concludes itself.

Figure 5:
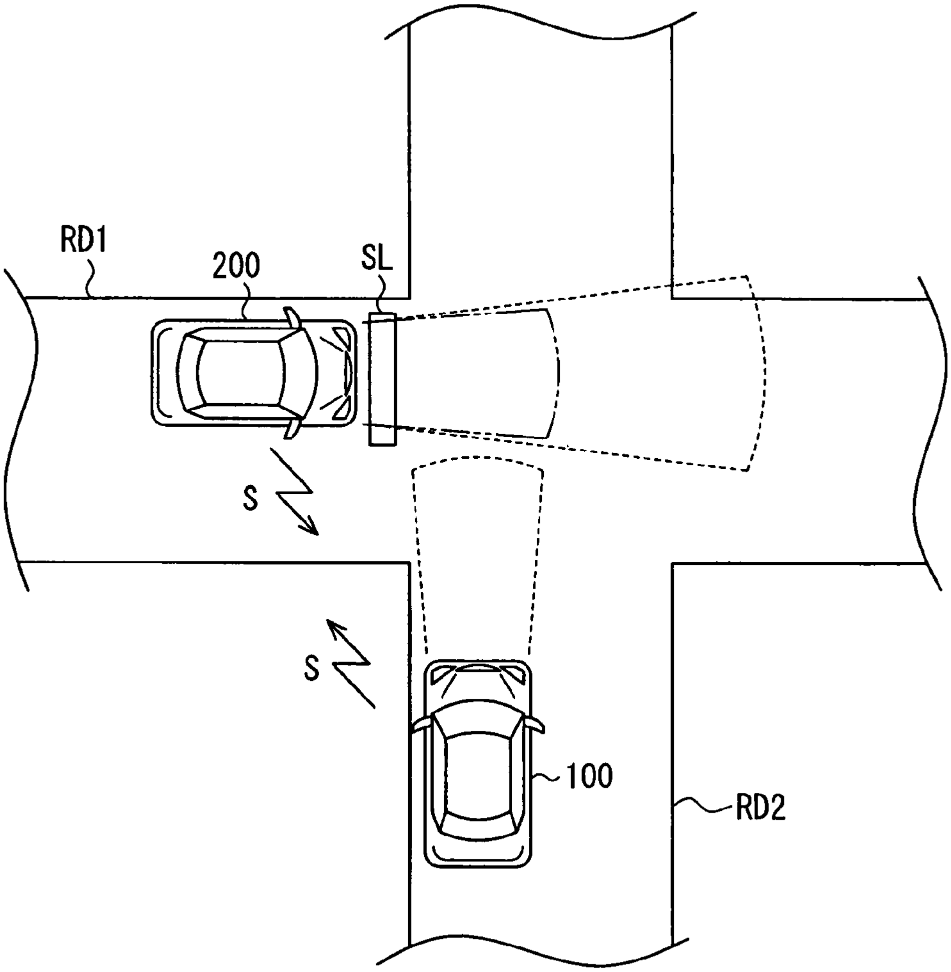
FIG. 5 shows an illustration of an intersection with two approaching vehicles equipped with the driving support apparatus of the present disclosure.
Figure 6:
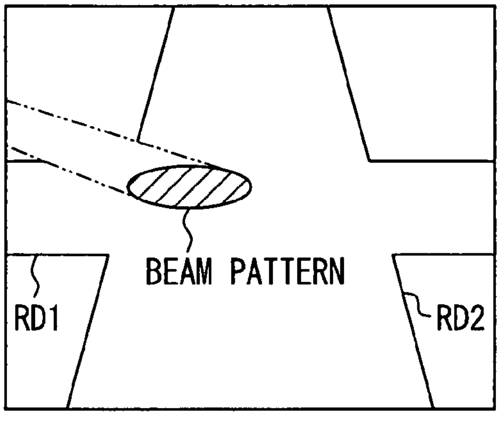
FIG. 6 shows an illustration of a beam pattern captured by an image sensor of the driving support apparatus.

The traffic at an intersection controlled by using the driving support system and apparatuses of the present embodiment is illustrated in the drawings in FIGS. 5 and 6.

As shown in FIG. 5 and FIG. 10, a vehicle 100 approaching the intersection from a road RD 2 and a vehicle 200 stopping at a stop line SL of the intersection on a road RD 1 are used for describing the situation of traffic control by the driving support system and apparatuses. In this case, the roadside facility (RF) for transmitting the stop signal to the vehicles is disposed at a proximity of the intersection around the stop line SL on the road RD 1. Further, an image captured by the image sensor SEN in cooperation with the MPU 11 on the approaching vehicle 100 is illustrated in FIG. 6.

Figure 7:
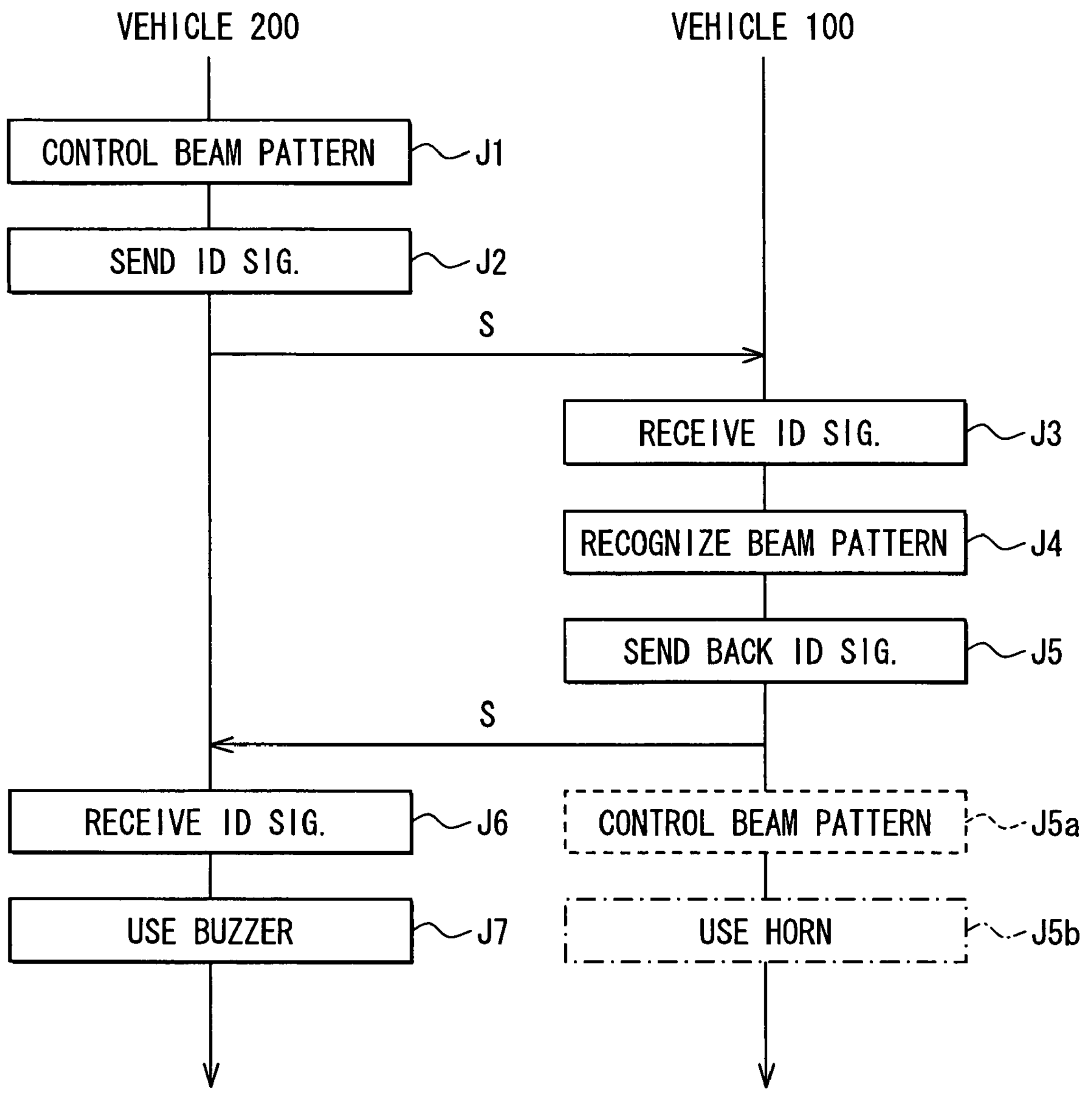
FIG. 7 shows a sequence chart of a communication process between two vehicles equipped with the driving support apparatus.

FIG. 7 shows a sequence chart of a communication process between two vehicles (100 and 200 in this case) respectively equipped with the driving support apparatus.

As shown in FIG. 7, in step J1 on the stopping vehicle 200, the beam pattern is controlled to blink and the light axis is controlled to the low beam for lighting the road surface in the intersection, when the stop signal is received at the proximity of the stop line SL from the roadside facility (RF).

In step J2 on the stopping vehicle 200, the vehicle ID signal including the unique ID is transmitted.

In step J3 on the approaching vehicle 100, the vehicle ID signal from the vehicle 200 is received. At this point, the image data illustrated in FIG. 6 is captured by the image sensor SEN and the image MPU 11.

In step J4 on the approaching vehicle 100, the blinking beam pattern on the road surface irradiated by the stopping vehicle 200 is recognized. The beam pattern may also be recognized by the driver of the vehicle 100, thereby serving a warning for the driver of the vehicle 100 that there is a vehicle (i.e., the vehicle 200) close to the intersection.

In step J5 on the approaching vehicle 100, the vehicle ID signal (S) from the stopping vehicle 200 is transmitted back to the stopping vehicle 200.

In step J6 on the stopping vehicle 200, the vehicle ID signal (S) transmitted back from the approaching vehicle 100 is received.

In step J7 on the stopping vehicle 200, the buzzer 13 is used for providing the buzzing sound. In this manner, the driver of the stopping vehicle 200 recognizes the existence of the approaching vehicle 100 on the road RD 2 based on the buzzing sound, and is encouraged to keep stopping for an extended period.

As described step by step in the above description, the drivers on both of the vehicles 100 and 200 can reciprocally recognize the existence of the other vehicle. In addition, the driver of the stopping vehicle 200 is encouraged to keep stopping. Therefore, the driving support system and apparatuses of the present disclosure provides an appropriate driving support for the vehicles and traffic at and around the intersection. Further, the difference of the beam patterns due to the difference of models, makes and the like is preferably absorbed by modifying recognition algorithm that is used in the image MPU 11 for improved accuracy of beam pattern recognition.

Although the present invention has been fully described in connection with the preferred embodiment thereof with reference to the accompanying drawings, it is to be noted that various changes and modifications will become apparent to those skilled in the art.

For example, as described in the above embodiment, the roadside facility (RF) at the proximity of the intersection for transmitting the stop signal may be replaced with any other trigger that indicates the existence of the intersection. That is, the intersection ahead of the vehicle may be detected based on the recognition of the stop line at the proximity of the road surface of the intersection by the image MPU 11 or the like. In addition, the detection and recognition of the intersection may be based on the combination of two or more conditions. That is, the reception of the stop signal accompanied by the recognition of the stop line may be used for triggering the control of the beam pattern.

Further, the image sensor SEN may be different from the CCD type image sensor. That is, a complementary metal-oxide semiconductor (CMOS) type image sensor may be used as the image sensor.

Figure 8:
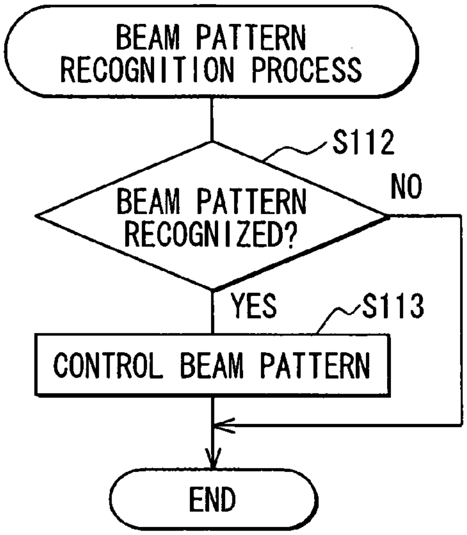
FIG. 8 shows a flowchart of a beam control process in another embodiment of the present disclosure.
Figure 9:
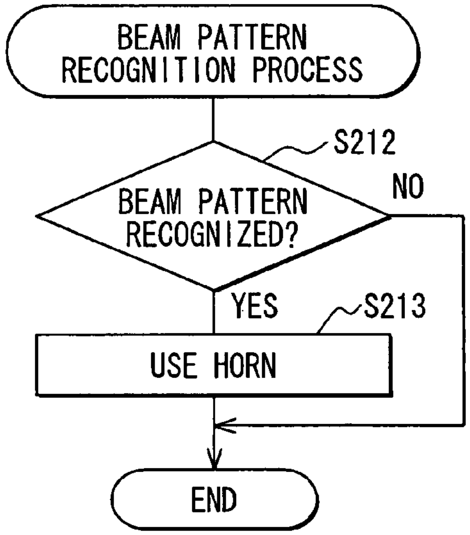
FIG. 9 shows a flowchart of a beam control process in yet another embodiment of the present disclosure.

Further, the transmission of the vehicle ID signal back to the other vehicle may be omitted at the time of beam pattern recognition. That is, as shown in FIG. 8, the beam pattern recognition in step S112 may be followed by the control of the beam pattern in step S113. The modification of the response to the beam pattern recognition may be, as shown in FIG. 9, the use of a horn in step S213. In this manner, as shown in FIG. 7, the approaching vehicle 100 may control the beam pattern in step J5*a*, or may use the horn in step J5*b* in response to the recognition of the beam pattern on the road surface ahead of the vehicle.

Furthermore, the beam pattern recognition may be accompanied by the control of the beam pattern and/or the use of the horn after transmission of the vehicle ID signal (S) back to the other vehicle. In other words, the transmission of the vehicle ID signal (S), the control of the beam pattern, and the use of the horn may be arbitrarily combined as the response to the recognition of the other vehicle.

Furthermore, the vehicle ID signal (S) may be replaced with any other signal that uniquely identifies the vehicle of interest.

Such changes and modifications are to be understood as being within the scope of the present invention as defined by the appended claims.

What is claimed is:

1. A driving support system for use in a vehicle comprising:

a light control unit for controlling a light of the vehicle, wherein the light is controlled to light an intersection road surface when the vehicle is stopping at a stop position of an intersection;

a signal transmission unit for transmitting an entrance signal before the vehicle is entering the intersection, wherein the entrance signal is transmitted when lighting on the intersection road surface by a stopping vehicle at the intersection is detected by the transmission unit; and a notification unit for providing a stop notification that encourages a driver to stop at the stop position of the intersection for an extended time, wherein the notification unit provides the stop notification when the entrance signal is received by the notification unit, wherein at least two vehicles equipped with the light control unit, the signal transmission unit and the notification unit are organized as a system for supporting driving operation of the respective vehicles.

2. The driving support system as in claim 1, wherein the signal transmission unit detects the lighting on the intersection road surface by the stopping vehicle based on an image recognition.

3. The driving support system as in claim 1, wherein the light control unit wirelessly transmits an ID signal for identifying the self vehicle in addition to controlling the light of the self vehicle, the signal transmission unit receives the ID signal in addition to reciprocally transmitting the ID signal as the entrance signal, and the notification unit provides the stop notification based on a reception of the ID signal that is reciprocated to the self vehicle as the entrance signal.

4. The driving support system as in claim 1 further comprising:

a warning unit for providing a warning for a driver of the stopping vehicle, wherein a warning of an entrance of the self vehicle based on a detection of the lighting on the intersection road surface by the light of the stopping vehicle is provided for the driver of the stopping vehicle.

5. The driving support system as in claim 4, wherein the warning unit controls lighting pattern of the lighting in a predetermined manner for providing the warning that the self vehicle is entering the intersection.

6. The driving support system as in claim 4, wherein the warning unit uses a horn for providing the warning that the self vehicle is entering the intersection.

7. The driving support system as in claim 1, wherein a roadside transmitter transmits a stop signal at the stop position of the intersection for encouraging a driver of approaching vehicles to stop at the intersection, and the light control unit controls the lighting of the self vehicle based on a reception of the stop signal from the transmitter.

8. A driving support system for use in a self vehicle comprising:

a light control unit for controlling a light of the self vehicle, wherein the light is controlled to light an intersection road surface when the self vehicle is stopping at a stop position of an intersection; and a warning unit for providing a warning for a driver of a stopping vehicle, wherein a warning of an entrance of the self vehicle based on a detection of the lighting on the intersection road surface by a stopping vehicle is provided for the driver of the stopping vehicle, wherein at least two vehicles equipped with the light control unit and the warning unit for reciprocal communication are organized as a system for supporting driving operation of the respective vehicles.

9. The driving support system as in claim 8, wherein the warning unit controls lighting pattern of the lighting for providing the warning that the self vehicle is entering the intersection.

10. The driving support system as in claim 8, wherein the warning unit uses a horn for providing the warning that the self vehicle is entering the intersection.

11. A driving support apparatus for use in a self vehicle comprising:

a light control unit for controlling a light of the self vehicle, wherein the light is controlled to light an intersection road surface when the self vehicle is stopping at a stop position of an intersection;

a signal transmission unit for transmitting an entrance signal before the self vehicle is entering the intersection, wherein the entrance signal is wirelessly transmitted when lighting on the intersection road surface by the light of a stopping vehicle at the intersection is detected by the transmission unit; and a notification unit for providing a stop notification that encourages a driver of the self vehicle to stop at the stop position of the intersection for an extended time, wherein the notification unit provides the stop notification when the entrance signal is received by the notification unit.

12. The driving support apparatus as in claim 11, wherein the signal transmission unit detects the lighting on the intersection road surface by the stopping vehicle based on an image recognition.

13. The driving support apparatus as in claim 11, wherein the light control unit wirelessly transmits an ID signal for identifying the self vehicle in addition to controlling the light of the self vehicle, the signal transmission unit receives the ID signal in addition to reciprocally transmitting the ID signal as the entrance signal, and the notification unit provides the stop notification based on a reception of the ID signal that is reciprocated to the self vehicle as the entrance signal.

14. The driving support apparatus as in claim 11 further comprising:

a warning unit for providing a warning for a driver of the stopping vehicle, wherein a warning of an entrance of the self vehicle based on a detection of the lighting on the intersection road surface by the light of the stopping vehicle is provided for the driver of the stopping vehicle.

15. The driving support apparatus as in claim 14, wherein the warning unit controls lighting pattern of the lighting in a predetermined manner for providing the warning that the self vehicle is entering the intersection.

16. The driving support apparatus as in claim 14, wherein the warning unit uses a horn for providing the warning that the self vehicle is entering the intersection.

17. The driving support apparatus as in claim 11, wherein a roadside transmitter transmits a stop signal at the stop position of the intersection for encouraging a driver of approaching vehicles to stop at the intersection, and the light control unit controls the lighting of the self vehicle based on a reception of the stop signal from the transmitter.

18. A driving support apparatus for use in a self vehicle comprising:

a light control unit for controlling a light of the self vehicle, wherein the light is controlled to light an intersection road surface when the self vehicle is stopping at a stop position of an intersection; and a warning unit for providing a warning for a driver of a stopping vehicle, wherein a warning of an entrance of the self vehicle based on a detection of the lighting on the intersection road surface by the light of a stopping vehicle is provided for the driver of the stopping vehicle.

19. The driving support apparatus as in claim 18, wherein the warning unit controls lighting pattern of the lighting in a predetermined manner for providing the warning that the self vehicle is entering the intersection.

20. The driving support apparatus as in claim 18, wherein the warning unit uses a horn for providing the warning that the self vehicle is entering the intersection.

* * * * *